United States Patent Office 3,406,164
Patented Oct. 15, 1968

3,406,164
DISPERSE DYES OF THE MONOAZO SERIES
Ruedi Altermatt, Tecknau, Basel-Land, and Curt Mueller, Basel, Switzerland, assignors to Sandoz Ltd. (also known as Sandoz A.G.), Basel, Switzerland
No Drawing. Filed Jan. 13, 1966, Ser. No. 520,365
Claims priority, application Switzerland, Jan. 14, 1965, 519/65
16 Claims. (Cl. 260—207)

ABSTRACT OF THE DISCLOSURE

Monoazo dyes which are virtually insoluble in water and are of the formula

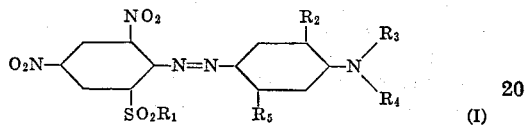

wherein:
$R_1$ is lower alkyl;
$R_2$ is hydrogen, lower alkyl or lower alkoxy;
$R_3$ is alkylcarbonylalkyl, acyloxyalkyl, alkoxycarbonylalkyl or alkoxycarbonyloxyalkyl;
$R_4$ is cyanoalkyl, acyloxyalkyl, alkoxycarbonylalkyl or alkoxycarbonyloxyalkyl; and
$R_5$ is alkoxy, acylamino, alkoxycarbonylamino, aralkoxycarbonylamino or aryloxycarbonylamino;
are excellent disperse dyes for a number of fibers and fabrics prepared therefrom. Dyeings obtained with said dyes are extremely fast; their dischargeability and reserve of wool and cotton are good; and they are stable to boiling and reduction at temperatures up to at least 220° C.

This invention relates to new dyes which are virtually insoluble in water and to the process for their production. The dyes correspond to the formula

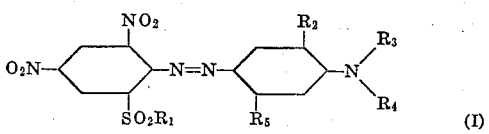

where:
$R_1$ is a member selected from a group or radicals consisting of methyl, ethyl and halogeno-, cyano and hydroxyl-substituted methyl and ethyl,
$R_2$ is a member selected from the group consisting of hydrogen, methyl, ethyl, methoxy and ethoxy,
$R_3$ is a member selected from the group consisting of alkylcarbonylalkyl, unsubstituted and halogeno-, cyano-, alkoxy- and acyl-substituted acyloxyalkyl, alkoxycarbonylalkyl and alkoxycarbonyloxyalkyl,
$R_4$ is a member selected from the group consisting of cyanoalkyl, unsubstituted and halogeno-, cyano-, alkoxy- and acyl-substituted acyloxyalkyl, alkoxycarbonylalkyl and alkoxycarbonyloxyalkyl and $R_5$ is a member selected from the group consisting of alkoxy, unsubstituted and halogeno-, alkoxy- aralkoxy- and aryloxy-substituted acylamino, alkoxycarbonylamino, aralkoxycarbonylamino and aryloxycarbonylamino.

The said process for the production of these dyes consists in coupling a diazotized amine of formula

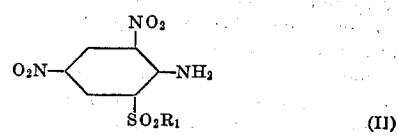

with a compound of formula

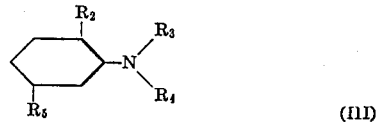

Epecially preferred dyestuffs are of the formula

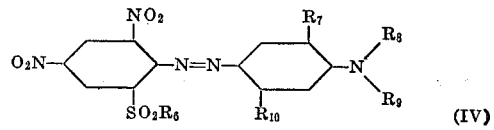

where:

$R_6$ is a member selected from the group consisting of methyl, ethyl, chlormethyl, cyanomethyl, brommethyl, chlorethyl, bromethyl, cyanoethyl and hydroxyethyl,
$R_7$ is a member selected from the group consisting of hydrogen, methyl, ethyl, methoxy and ethoxy,
$R_8$ is a member selected from the group consisting of acetyl-ethyl, formyloxyethyl, methoxycarbonylethyl, ethoxycarbonylethyl, acetoxyethyl, chloro- and bromoacetoxyethyl, cyanoacetoxyethyl, methoxyacetoxyethyl, ethoxyacetoxyethyl, propyloxyacetoxyethyl, acetoxyacetoxyethyl, methoxycarbonyloxyethyl, ethoxycarbonyloxyethyl, chloro- and bromo-ethoxycarbonyloxyethyl, propylcarbonyloxyethyl, acetoacetoxyethyl, methoxycarbonyloxyethyl, ethoxycarbonyloxyethyl, chloro- and bromo - ethoxycarbonyloxyethyl, propylcarbonyloxyethyl, propionyloxyethyl, methoxypropionyloxyethyl, ethoxpropionyloxyethyl, chloro- and bromo-propionyloxyoxyethyl, cyanopropionyloxyethyl and methoxybutyryloxyethyl,
$R_9$ is a member selected from the group consisting of cyanoethyl, formyloxyethyl, methoxycarbonylethyl, ethoxycarbonylethyl, acetoxyethyl, chloro- and bromoacetoxyethyl, cyanoacetoxyethyl, methoxyacetoxyethyl, ethoxyacetoxyethyl, propyloxyacetoxyethyl, acetoxyacetoxyethyl, methoxycarbonyloxyethyl, ethoxycarbonyloxyethyl, chloro- and bromo-ethoxycarbonyloxyethyl, propylcarbonyloxy ethyl, acetoacetoxyethyl, methoxycarbonyloxyethyl, ethoxycarbonyloxyethyl, chloro- and bromo - ethoxycarbonyloxyethyl, propylcarbonyloxyethyl, propionyloxyethyl, methoxypropionyloxyethyl, ethoxypropionyloxyethyl, choro- and bromo-propionyloxyethyl, cyanopropionyloxyethyl and methoxybutyryloxyethyl, $R_{10}$ is a member selected from the group consisting of methoxy, ethoxy, formylamino, acetylamino, chloroacetylamino, methoxyacetylamino, ethoxyacetylamino, phenyloxyacetylamino, methoxycarbonylamino, ethoxycarbonylamino, chloro- and bromo-ethoxycarbonylamino, methoxymethoxycarbonylamino, ethoxymethylcarbonylamino, phenylmethylcarbonylamino, tertiary butylcarbonylamino, phenyloxyacetylamino, phenylmethoxycarbonylamino, phenylmethoxymethoxycarbonylamino, propionylamino, mono- and di-chloropropionylamino, bromopropionylamino, butyrylamino, mono- and di-chlorobutyrylamino, methoxybutyrylamino, cyanobutyrylamino, phenyloxybutyrylamino and benzoylamino.

In the preceding definitions of $R_6$ through $R_{10}$ the alkyl of each alkyl and of each alkoxy is lower alkyl, each acyl is either formyl, lower alkanoyl or benzoyl, and each aryl is phenyl.

The process for the production of these dyes consists of coupling a diazotized amine of formula

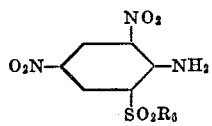

(V)

with a compound of formula

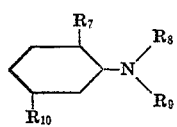

(VI)

United States Patent 2,111,300 and German Patents 744,073 and 636,952 disclose monoazo dyes of similar constitution. In comparison with dyes containing unesterified hydroxyethyl groups, such as those described in the aforestated patents, the esterified dyes of the present invention exhibit substantialy higher affinity for cellulose acetate and, in particular, for polyester fibres.

French Patent 1,211,477 describes dyes which have the same coupling component and a similar diazo component. These dyes are less fast to thermofixation and sublimation than those of the present invention.

The affinity and build-up properties of blue disperse dyes of the azo series are of special technical importance since blue is an essential component for the production of brown and grey combination shades. In combination dyeing the component dyes must exhaust the bath within wide limits in order to give dyeings of reproducible shade and depth. Another advantage of blue dyes with good build-up properties is that they are the type suitable for producing heavy navy blue dyeings.

The following amines are named as examples of suitable diazo components:

2-amino-3,5-dinitro-1-methylsulphonylbenzene
2-amino-3,5-dinitro-1-ethylsulphonylbenzene
2-amino-3,5-dinitro-1-chloromethylsulphonylbenzene
2-amino-3,5-dinitro-1-cyanomethylsulphonylbenzene
2-amino-3,5-dinitro-1-hydroxyethylsulphonylbenzene
2-amino-3,5-dinitro-1-$\beta'$-chlorethylsulphonylbenzene Examples of suitable coupling components are:

5-acetylamino-2-ethoxy-1-N,N-di-(acetoxyethyl)-aminobenzene,
1-N,N-di-(acetoxyethyl)-amino-2-ethoxy-5-propionylaminobenzene,
1-N,N-di-(acetoxyethyl)-amino-2-methoxy-5-propionylaminobenzene,
5-acetylamino-1-N,N-di-(acetoxyethyl)amino-2-methoxybenzene,
5-acetylamino-2-methoxy-1-N,N-di-(propionyloxyethyl)-aminobenzene,
5-acetylamino-2-ethoxy-1-N,N-di-(propionyloxyethyl)-aminobenzene,
1-N-(2'-acetoxyethyl)-N-(2'-cyanoethyl)amino-2,5-dimethoxybenzene,
2-ethoxy-1-,N,N-di-(propionyloxyethyl)-amino-5-propionylaminobenzene,
2-methoxy-1-N,N-di-(propionyloxyethyl)-amino-5-propionylaminobenzene,
1-N,N-di-(acetoxyethyl)-amino-3-propionylaminobenzene,
1-N,N-di-(acetoxyethyl)-amino-3-acetylaminobenzene,
5-acetylamino-1-N,N-di-(acetoxyethyl)-amino-2-methylbenzene,
1-N,N-di-(acetoxyethyl)-amino-2-methyl-5-propionylaminobenzene,
5-acetylamino-1-N-(2'-acetoxyethyl)-N-(2'-cyanoethyl)-amino-2-ethoxybenzene,
5-acetylamino-1-N-(2'-acetoxyethyl)-N-(2'-cyanoethyl)-amino-2-methoxybenzene,
5-acetylamino-2-ethoxy-1-N,N-di-(2'-cyanoethyl)-N-(2'-methoxycarbonylethyl)-aminobenzene,
5-acetylamino-2-ethoxy-1-N,N-di-(2'-methoxycarbonylethyl)-aminobenzene,
5-acetylamino-2-ethoxy-1-N-(2'-acetoxyethyl)-N-(2'-methoxycarbonylethyl)-aminobenzene
1-N,N-di-(2'-methoxycarbonylethyl)-amino-3-propionylaminobenzene,
3-acetylamino-1-N,N-di-(2'-methoxycarbonylethyl)-aminobenzene,
2-ethoxy-1-N,N-di-(2'-acetoxyethyl)-amino-5-carboethoxyaminobenzene,
2-ethoxy-1-N,N-di-(2'-acetoxyethyl)-amino-5-(2'-chloroethoxycarbonyl)-aminobenzene,
2-ethoxy-1-N,N-di-(2'-acetoxyethyl)-amino-5-(2'-chloropropionyl)-aminobenzene,
2-ethoxy-1-N,N-di(2'-acetoxyethyl)-amino-5-(1-chloropropionyl)-aminobenzene,
5-acetylamino-2-ethoxy-1-N,N-di-(2'-carboethoxyoxyethyl)-aminobenzene,
5-acetylamino-2-ethoxy-1-N,N-di-(2'-cyanoacetoxyethyl)-aminobenzene,
5-acetylamino-2-ethoxy-1-N,N-di(2'-acetoacetoxyethyl)-aminobenzene,
5-acetylamino-2-ethoxy-1-N,N-di-[2'-(2''-chloropropionyl)-oxyethyl]-aminobenzene,
5-acetylamino-2-ethoxy-1-N,N-di-(2'-methoxyacetoxyethyl)-aminobenzene,
5-acetylamino-2-ethoxy-1-N-(2'-carboethoxyethyl)-N-(2'-cyanoethyl)-aminobenzene,
1-N-(2'-acetoxyethyl)-N-(2'-cyanoethyl)-amino-3-propionylaminobenzene,
1-N-(2'-cyanoethyl)-N-(2'-methoxycarbonylethyl)-amino-3-propionylaminobenzene,
3-acetylamino-1-N-(2'-acetoxyethyl)-N-(2'-cyanoethyl)-aminobenzene,
1-N,N-di-(2'-acetoxyethyl)-amino-2-methoxy-5-(2'-methoxypropionyl)-aminobenzene,
1-N,N-di-(2'-acetoxyethyl)-amino-2-methoxy-5-(1'-methoxypropionyl)-aminobenzene,
1-N,N-di-(2'-acetoxyethyl)-amino-2-methoxy-5-(2'-ethoxypropionyl)-aminobenzene,
1-N,N-di(2'-acetoxyethyl)-amino-2-methoxy-5-(phenyloxycarbonyl)-aminobenzene,
5-acetylamino-1-N,N-di-(2'-chloroacetoxyethyl)-amino-2-methoxybenzene,
5-acetylamino-2-ethoxy-1-N-(2'-acetoxyethyl)-N-(2'-methylcarbonylethyl)-aminobenzene,
5-formylamino-2-ethoxy-1-N,N-di-(2'-acetoxyethyl)-aminobenzene,
1-N,N-di-(2'-acetoxyethyl)amino-2,5-dimethoxybenzene,
1-N,N-di-(2'-methoxycarbonylethyl)-amino-2,5-dimethoxybenzene, 1-N,N-di-(2′-methoxycarbonylethyl)-amino-2,5-dimethoxybenzene, 5-acetylamino-2-ethoxy-1-N,N-di-(3′-acetoxypropyl)-aminobenzene.

Generally the coupling reaction is effected in an acid medium, which may be buffered if necessary, and with cooling, for example at temperatures of 0° to 5° C.

The new dyes thus obtained are excellent disperse dyes. It is of special advantage to convert them by known methods into dye preparations before use. This is effected by comminution to an average particle size of about 0.01 to 10 microns or more particularly 0.1 to 5 microns. Comminution can be carried out in the presence of dispersants and fillers. For example, the dried dye can be ground with a dispersant, if necessary in the presence of fillers, or it can be kneaded in paste form with a dispersant and subsequently vacuum or jet dried.

After the addition of a suitable volume of water, the resulting preparations can be used for dyeing, padding or printing at long or short liquor ratios. For dyeing at long ratios, it is general practice to use amounts of up to about 20 grams of dye per litre; for padding, up to about 150 grams, or preferably 0.1 to 100 grams, per litre; and for printing, up to about 150 grams per kilogram of print paste. The liquor ratio may vary within wide limits, e.g. from about 1:3 to 1:200 or, preferably, 1:2 to 1:80. The dyes build up excellently from aqueous dispersion on products made of synthetic or semisynthetic hydrophobic organic substances of high molecular weight. They are especially suitable for dyeing, padding or printing fibres, loose filaments and textile materials of linear aromatic polyester, cellulose diacetate and cellulose triacetate. They can also be used for dyeing synthetic polyamides, polyolefins, acrylonitrile polymerization products and polyvinyl compounds. High quality dyeings are obtained on linear aromatic polyester, which in the main are polycondensation products of terephthalic acid and glycols, notably ethylene glycol, and are marketed under the registered trade names, "Terylene," "Diolene," "Dacron," etc.

The known dyeing methods are used. Polyester fibres can be exhaustion dyed in the presence of carriers at temperatures of about 80° to 125° C. or, in the absence of carriers, under pressure at about 100° to 140° C. These fibres can also be padded or printed with aqueous dispersions of the new dyes and paddings or prints fixed at about 140° C. to 230° C. with the aid of water vapour or air. In the optimum temperature range of 180° to 220° C. the dyes diffuse rapidly into polyester fibre and do not then sublime, even when exposed for some length of time to these high temperatures, so that there is no inconvenient contamination of the dyeing and fixing equipment. Cellulose diacetate is dyed preferably in the temperature range of about 65° to 80° C. and cellulose triacetate at temperatures up to about 115° C. The optimum pH region is 2 to 9 or, more particularly, 4 to 8.

The normal dispersing agents, preferably those of anionic or nonionic character, can be used, either alone or in mixture. Often about 0.5 gram dispersing agent per litre of the dyeing medium is sufficient although larger amounts up to about 3 grams per litre can be used. Amounts in excess of 5 grams do not usually offer any further advantage. Known anionic dispersing agents suitable for the process are, for example, the condensation products of naphthalene-sulphonic acids and formaldehyde, in particular dinaphthylmethane disulphonates, the esters of sulphonated succinic acid, Turkey red oil, the alkaline salts of the sulphuric acid esters of fatty alcohols, e.g. sodium lauryl sulphate or sodium cetyl sulphate, sulphite cellulose waste liquor and its alkaline salts, soaps, and the alkaline sulphates of the monoglycerides of fatty acids. Examples of known and especially suitable nonionic dispersing agents are the adducts of approximately 3–40 mols of ethylene oxide with alkyl phenyls, fatty alcohols or fatty amines, and their neutral sulphuric acid esters.

The normal thickening agents are used for padding and printing, e.g. modified or unmodified natural products, such as sodium alginates, British gum, gum Arabic, crystal gum, locust bean gum, gum tragacanth, carboxymethyl cellulose, hydroxyethyl cellulose, starches, or synthetic products, such as polyacrylamides and polyvinyl alcohol.

The dyeings obtained are extremely fast to heat (i.e. thermofixation, sublimation and pleating), gas fumes, cross dyeing, dry cleaning, chlorine, and to wet tests, such as water, washing and perspiration. The dischargeability and reserve of wool and cotton are good. The light fastness is outstanding even in pale shades, which makes the new dyes very suitable as components for the production of fashionable combination shades in pastel depths. The dyes are stable to boiling and reduction at temperatures up to at least 220° C., showing particularly good stability at 80° to 140° C.; this stability is not adversely affected either by the liquor ratio or by the presence of dyeing accelerants.

The blue members of this new group of dyes are suitable for combination with small amounts of red dyes for the production of low-cost navy blue dyeings which are fast to light, washing, perspiration, sublimation, pleating and thermofixation, and also for combination with red and yellow dyes for fast black dyeings. Combination dyeings with yellow dyes show an even tone-intone fade on exposure to light.

In the following examples the parts and percentages are by weight and the temperatures are in degrees centigrade.

EXAMPLE 1

6.9 parts of powdered sodium nitrite are added with vigorous stirring to 120 parts of concentrated sulphuric acid at 60–70°. After stirring for a further 10 minutes at 60° and cooling to 10°, 100 parts of glacial acetic acid are added at 10–15°, followed by 26.1 parts of 2-amino-3,5-dinitro-1-methylsulphonylbenzene and 100 parts of glacial acetic acid. Stirring is continued for 2 hours, then the resulting diazonium salt solution is run into a mixture of 36.6 parts of 5-acetylamino-2-ethoxy-1-N,N-di-(acetoxyethyl)-aminobenzene, 100 parts of glacial acetic acid, 10 parts of aminosulphonic acid and 200 parts of ice. The coupling reaction is brought to an end in acid medium by neutralizing to pH 2.0–2.5 with sodium acetate. The dye forms immediately and settles out. It is filtered off, washed free of acid, dried and re-crystallized from a mixture of equal parts of ethanol and acetone. The pure dye melts at 147° and dyes synthetic fibres in greenish blue shades which have good fastness properties.

EXAMPLE 2

6.9 parts of finely divided sodium nitrite are added slowly with stirring to 120 parts of concentrated sulphuric acid at 60–70°, after which stirring is continued for 10 minutes at 60° with subsequent cooling to 20°. At this temperature 26.1 parts of 2-amino-3,5-dinitro-1-methylsulphonylbenzene are added, and after stirring for a further 2 hours at 20–25° C. the resulting diazonium salt solution is run into a mixture of 33.6 parts of 1-N,N-di-(acetoxyethyl) - amino - 3 - propionylaminobenzene, 100 parts of glacial acetic acid, 150 parts of ice and 10 parts of aminosulphonic acid. The coupling reaction is finalized in an acid medium which may be buffered if necessary. The precipitated dye is filtered off, washed free of acid, dried and recrystallized from alcohol. In the pure state it melts at 160°. The dye dyes synthetic fibres in bluish violet shades.

EXAMPLE 3

6.9 parts of powdered sodium nitrite are added with vigorous stirring to 120 parts of concentrated sulphuric acid at 60–70°. Stirring is continued for 10 minutes at 60° and the bath cooled to 10°, then 100 parts of glacial acetic acid are added at 10–15° followed by 26.1 parts of 2-amino-3,5-dinitro-1-methylsulphonylbenzene and 100 parts of glacial acetic acid. After stirring for another 2 hours the diazonium salt solution thus formed is run into a mixture of 33.3 parts of 5-acetylamino-2-ethoxy-1-N-(2'-acetoxyethyl)-N-(2'-cyanoethyl)-aminobenzene, 100 parts of glacial acetic acid, 10 parts of aminosulphonic acid and 200 parts of ice. The coupling reaction is brought to a close in acid medium by adjusting to pH 2.0–2.5 with sodium acetate. The dye forms immediately and settles out. It is filtered off, washed free of acid, dried and recrystallized from a mixture of equal parts of ethanol and dioxan. The pure dye melts at 170°–171° and dyes synthetic fibres in blue shades which have good fastness properties.

Dyeing instructions 1.—A mixture of 7 parts of the dye obtained according to Example 1, 4 parts of sodium dinaphthylmethanedisulphonate, 4 parts of sodium cetyl sulphate and 5 parts of anhydrous sodium sulphate is ground in a ball mill for 48 hours to a fine powder. 2 parts of the powder are dispersed in a bath of 3000 parts of water containing 3 parts of a 30% solution of a highly sulphonated castor oil and 20 parts of an emulsion of a chlorinated benzene. 100 parts of a fabric of "Dacron" (registered trademark) polyester fibre are introduced into the bath at 20–25° C., its temperature is raised to 95–100° in about 30 minutes and dyeing continued for 1 hour at this temperature. The fabric is then removed, rinsed, soaped for 15 minutes at 70° with a 0.1% solution of an alkylphenylpolyglycol ether, rinsed again and dried. A greenish blue dyeing with excellent fastness properties is obtained.

Dyeing instructions 2.—A mixture of 30 parts of the dye obtained according to Example 1, 40 parts of sodium dinapthylmethanedisulphonate, 50 parts of sodium cetyl sulphate and 50 parts of anhydrous sodium sulphate is ground in a ball mill for 48 hours to a fine powder. 4 parts of the powder are dispersed in 1000 parts of water at 40–50°. 100 parts of a fabric of "Terylene" (registered trademark) polyester fibre are entered, the bath temperature raised slowly and the fabric dyed for about 1 hour under pressure at 130°. After rinsing, soaping, rinsing and drying, a greenish blue dyeing with excellent fastness properties is obtained.

Dyeing instructions 3.—A mixture of 15 parts of the dye obtained according to Example 1, 20 parts of sodium dinaphthylmethanedisulphonate, 25 parts of sodium cetyl sulphate and 25 parts of anhydrous sodium sulphate is ground for 48 hours in a ball mill to a fine powder. 5 parts of the powder are dispersed in 4000 parts of water. 100 parts of a scoured fabric of "Arnel" (registered trademark) cellulose triacetate fibre are entered and the bath raised slowly to 95–100°. The fabric is dyed for about 1 hour at this temperature, then removed, rinsed, soaped for 15 minutes at 70° with a 0.1% solution of an alkylphenylpolyglycol ether, rinsed again and dried. A greenish blue dyeing with good fastness properties is obtained.

Dyeing instructions 4.—A mixture of 7 parts of the dye obtained according to Example 2, 4 parts of sodium dinaphthylmethanedisulphonate, 4 parts of sodium cetyl sulphate and 5 parts of anhydrous sodium sulphate is ground for 48 hours in a ball mill to a fine powder. 2 parts of the powder are dispersed in 3000 parts of water containing 3 parts of a 30% solution of a highly sulphonated castor oil. 100 parts of a fabric of cellulose diacetate fibre is entered at 20–25° and the bath raised to 80–82° in about 30 minutes, after which dyeing is continued for 1 hour at this temperature. The fabric is then removed, rinsed, soaped, rinsed and dried. A violet dyeing is obtained which has notably good fastness to gas fumes.

The dyes detailed in the following table are produced according to the procedure of Example 1 from a diazotized amine of Formula II and a compound of Formula III.

| Example number | $R_1$ | $R_2$ | $R_3$ | $R_4$ | $R_5$ | Shade on Polyester fibre |
|---|---|---|---|---|---|---|
| 4 | —CH$_3$ | —OCH$_3$ | —CH$_2$CH$_2$OCOCH$_3$ | —CH$_2$CH$_2$OCOCH$_3$ | —NHCOCH$_3$ | Greenish blue. |
| 5 | —CH$_3$ | —OCH$_3$ | —CH$_2$CH$_2$OCOCH$_3$ | —CH$_2$CH$_2$OCOCH$_3$ | —NHCOC$_2$H$_5$ | Do. |
| 6 | —CH$_3$ | —OC$_2$H$_5$ | —CH$_2$CH$_2$OCOCH$_3$ | —CH$_2$CH$_2$OCOCH$_3$ | —NHCHO | Do. |
| 7 | —CH$_3$ | —OC$_2$H$_5$ | —CH$_2$CH$_2$OCOCH$_3$ | —CH$_2$CH$_2$OCOCH$_3$ | —NHCOCH$_3$ | Do. |
| 8 | —CH$_3$ | —OC$_2$H$_5$ | —CH$_2$CH$_2$OCOCH$_3$ | —CH$_2$CH$_2$OCOCH$_3$ | —NHCOC$_2$H$_5$ | Do. |
| 9 | —CH$_3$ | —OC$_2$H$_5$ | —CH$_2$CH$_2$OCOCH$_3$ | —CH$_2$CH$_2$OCOCH$_3$ | —NHCHO | Do. |
| 10 | —CH$_3$ | —OC$_2$H$_5$ | —CH$_2$CH$_2$OCOCH$_3$ | —CH$_2$CH$_2$OCOCH$_3$ | —NHCOCH$_3$ | Do. |
| 11 | —CH$_3$ | —OC$_2$H$_5$ | —CH$_2$CH$_2$OCOCH$_3$ | —CH$_2$CH$_2$OCOCH$_3$ | —NHCOCH$_3$ | Do. |
| 12 | —CH$_3$ | H | —CH$_2$CH$_2$OCOCH$_3$ | —CH$_2$CH$_2$OCOCH$_3$ | —NHCOCH$_3$ | Bluish violet. |
| 13 | —CH$_3$ | H | —CH$_2$CH$_2$OCOCH$_3$ | —CH$_2$CH$_2$OCOCH$_3$ | —NHCOCH$_3$ | Do. |
| 14 | —CH$_3$ | H | —CH$_2$CH$_2$OCOCH$_3$ | —CH$_2$CH$_2$OCOCH$_3$ | —NHCOCH$_3$ | Do. |
| 15 | —CH$_3$ | H | —CH$_2$CH$_2$OCOCH$_3$ | —CH$_2$CH$_2$OCOCH$_3$ | —NHCOCH$_3$ | Do. |
| 16 | —CH$_3$ | H | —CH$_2$CH$_2$OCOCH$_3$ | —CH$_2$CH$_2$OCOCH$_3$ | —NHCOCH$_2$Cl | Do. |
| 17 | —CH$_3$ | H | —CH$_2$CH$_2$OCOCH$_3$ | —CH$_2$CH$_2$OCOCH$_3$ | —NHCOCH$_2$OCH$_3$ | Do. |
| 18 | —CH$_3$ | —OC$_2$H$_5$ | —CH$_2$CH$_2$OCOCH$_3$ | —CH$_2$CH$_2$CN | —NHCOCH$_3$ | Violet. |
| 19 | —CH$_3$ | —OC$_2$H$_5$ | —CH$_2$CH$_2$OCOCH$_3$ | —CH$_2$CH$_2$CN | —NHCOCH$_2$OCH$_3$ | Do. |
| 20 | —CH$_3$ | —OC$_2$H$_5$ | —CH$_2$CH$_2$OCOCH$_3$ | —CH$_2$CH$_2$CN | —NHCOCH$_3$ | Do. |
| 21 | —CH$_3$ | —OC$_2$H$_5$ | —CH$_2$CH$_2$OCOCH$_3$ | —CH$_2$CH$_2$CN | —NHCOCH$_3$ | Do. |
| 22 | —CH$_3$ | —OCH$_3$ | —CH$_2$CH$_2$OCOCH$_3$ | —CH$_2$CH$_2$OCOCH$_3$ | —NHCOCH$_3$ | Greenish blue. |
| 23 | —CH$_3$ | —OCH$_3$ | —CH$_2$CH$_2$OCOCH$_3$ | —CH$_2$CH$_2$OCOCH$_3$ | —NHCOCH$_3$ | Blue. |
| 24 | —CH$_3$ | —OC$_2$H$_5$ | —CH$_2$CH$_2$OCOCH$_3$ | —CH$_2$CH$_2$OCOCH$_3$ | —NHCOCH$_3$ | Do. |
| 25 | —CH$_3$ | —OCH$_3$ | —CH$_2$CH$_2$OCOCH$_3$ | —CH$_2$CH$_2$OCOCH$_3$ | —NHCOCH$_3$ | Do. |
| 26 | —CH$_3$ | —CH$_3$ | —CH$_2$CH$_2$OCOCH$_3$ | —CH$_2$CH$_2$OCOCH$_3$ | —NHCOCH$_3$ | Do. |
| 27 | —CH$_3$ | H | —CH$_2$CH$_2$OCOCH$_3$ | —CH$_2$CH$_2$OCOCH$_3$ | —NHCOCH$_3$ | Reddish violet. |
| 28 | —CH$_3$ | —CH$_3$ | —CH$_2$CH$_2$OCOCH$_3$ | —CH$_2$CH$_2$OCOCH$_3$ | —NHCOCH$_3$ | Violet. |
| 29 | —CH$_3$ | H | —CH$_2$CH$_2$OCOCH$_3$ | —CH$_2$CH$_2$OCOCH$_3$ | —NHCOCH$_2$CH$_3$ | Reddish violet. |
| 30 | —CH$_3$ | H | —CH$_2$CH$_2$OCOCH$_3$ | —CH$_2$CH$_2$OCOCH$_3$ | —NHCOCH$_3$ | Violet. |
| 31 | —CH$_3$ | —OC$_2$H$_5$ | —CH$_2$CH$_2$OCOCH$_3$ | —CH$_2$CH$_2$OCOCH$_3$ | —NHCOCH$_3$ | Blue. |

| Example number | R₁ | R₂ | R₃ | R₄ | R₅ | Shade on Polyester fibre |
|---|---|---|---|---|---|---|
| 32 | —CH₃ | —OCH₃ | —CH₂CH₂OCOCH₃ | —CH₂CH₂OCOCH₃ | —NHCOOCH₂CH₂Cl | Do. |
| 33 | —CH₃ | —OC₂H₅ | —CH₂CH₂OCOCH₃ | —CH₂CH₂OCOCH₃ | —NHCOCH₂OCH₂CH₃ | Greenish blue. |
| 34 | —C₂H₅ | —OC₂H₅ | —CH₂CH₂OCOCH₃ | —CH₂CH₂OCOCH₃ | —NHCOCH₃ | Do. |
| 35 | —CH₃ | —OC₂H₅ | —CH₂CH₂OCOCH₃ | —CH₂CH₂OCOCH₃ | —NHCO—⌬ | Do. |
| 36 | —CH₃ | —OC₂H₅ | —CH₂CH₂OCOCH₃ | —CH₂CH₂OCOCH₃ | —NHCOCH₂—⌬ | Do. |
| 37 | —CH₃ | —OC₂H₅ | —CH₂CH₂OCOCH₃ | —CH₂CH₂OCOCH₃ | —NHCOCHCl—⌬ | Blue. |
| 38 | —CH₃ | —OC₂H₅ | —CH₂CH₂OCOCH₃ | —CH₂CH₂OCOCH₃ | —NHCOOCH₂—⌬ | Blue. |
| 39 | —CH₃ | —OC₂H₅ | —CH₂CH₂OCOCH₃ | —CH₂CH₂OCOCH₃ | —NHCOOCH₂O—⌬ | Greenish blue. |
| 40 | —CH₃ | —OC₂H₅ | —CH₂CH₂OCOCH₃ | —CH₂CH₂OCOCH₃ | —NHCOCH₃ | Do. |
| 41 | —CH₃ | —OC₂H₅ | —CH₂CH₂OCOCH₃ | —CH₂CH₂OCOCH₃ | —NHCOC(CH₃)₃ | Do. |
| 42 | —CH₃ | H | —CH₂CH₂OCOCH₃ | —CH₂CH₂OCOCH₃ | —NHCOCH₃ | Bluish violet. |
| 43 | —CH₃ | H | —CH₂CH₂OCOCH₃ | —CH₂CH₂OCOCH₂Cl | —NHCOCH₃ | Do. |
| 44 | —CH₃ | H | —CH₂CH₂OCOCH₃ | —CH₂CH₂OCOCH₃ | —NHCOCH₃ | Blue. |
| 45 | —CH₃ | H | —CH₂CH₂OCOCH₃ | —CH₂CH₂OCOCH₂OCH₃ | —NHCOCH₃ | Do. |
| 46 | —CH₃ | H | —CH₂CH₂OCOCH₃ | —CH₂CH₂OCOC₂H₄CN | —NHCOCH₃ | Bluish violet. |
| 47 | —CH₃ | H | —CH₂CH₂OCOCH₃ | —CH₂CH₂OCOCH₃ | —NHCOCH₃ | Do. |
| 48 | —CH₃ | H | —CH₂CH₂OCOCH₃ | —CH₂CH₂CN | —NHCOCH₃ | Do. |
| 49 | —CH₃ | H | —CH₂CH₂OCOCH₃ | —CH₂CH₂OCHO | —NHCOCH₃ | Violet. |
| 50 | —CH₃ | —OCH₃ | —CH₂CH₂OCOCH₃ | —CH₂CH₂OCOCH₃ | —NHCOCH₃ | Blue. |
| 51 | —CH₃ | —OCH₃ | —CH₂CH₂OCOCH₂CH₃ | —CH₂CH₂OCOOCH₃CH₃ | —NHCOCH₃ | Do. |
| 52 | —CH₃ | —OCH₂CH₃ | —CH₂CH₂OCOOCH₂CH₃ | —CH₂CH₂OCOOCH₂CH₃ | —NHCOCO₃ | Do. |
| 53 | —CH₃ | —OCH₃ | —CH₂CH₂OCOOCH₂CH₂CN | —CH₂CH₂OCOOCH₂CH₂CN | —NHCOCH₃ | Do. |
| 54 | —CH₂Cl | —OCH₃ | —CH₂CH₂OCOCH₃ | —CH₂CH₂OCOOCH₂CH₂Cl | —NHCOCH₃ | Do. |
| 55 | —CH₂CN | —OCH₃ | —CH₂CH₂OCOCH₃ | —CH₂CH₂OCOCH₃ | —NHCOCH₃ | Do. |
| 56 | —CH₃ | —OCH₃ | —CH₂CH₂OCOCH₃ | —CH₂CH₂OCOCH₃ | —NHCOCH₃ | Greenish blue. |
| 57 | —CH₃ | —OCH₃ | —CH₂CH₂OCOCH₃ | —CH₂CH₂OCHO | —NHCOCH₃ | Do. |
| 58 | —CH₃ | —OCH₃ | —CH₂CH₂OCOCH₃ | —CH₂CH₂OCOCH₃ | —NHCOCH₃ | Do. |
| 59 | —CH₃ | —OCH₃ | —CH₂CH₂OCOCH₃ | —CH₂CH₂OCOCH₃ | —NHCOCH₃ | Do. |
| 60 | —CH₃ | —OCH₃ | —CH₂CH₂OCOCH₃ | —CH₂CH₂OCOCH₃ | —NHCOCH₃ | Do. |
| 61 | —CH₃ | —OCH₃ | —CH₂CH₂OCOCH₃ | —CH₂CH₂OCOCH₃ | —NHCOCH₃ | Do. |
| 62 | —CH₃ | —OCH₃ | —CH₂CH₂OCOCH₃ | —CH₂CH₂OCOCH₃ | —NHCOOCH₂CH₂Cl | Do. |
| 63 | —CH₃ | —OCH₃ | —CH₂CH₂OCOCH₃ | —CH₂CH₂OCOCH₃ | —NHCOOCH₂CH₃ | Do. |
| 64 | —CH₃ | —OCH₃ | —CH₂CH₂OCOCH₃ | —CH₂CH₂OCHO | —NHCOOCH₂CH₂Cl | Do. |
| 65 | —CH₃ | —OCH₃ | —CH₂CH₂OCOCH₃ | —CH₂CH₂OCHO | —NHCOOCH₂CH₂Cl | Do. |
| 66 | —CH₃ | —OCH₃ | —CH₂CH₂OCOCH₃ | —CH₂CH₂CN | —NHCOOCH₂CH₂Cl | Do. |
| 67 | —CH₃ | —OCH₃ | —CH₂CH₂OCOCH₃ | —CH₂CH₂CN | —NHCOOCH₂CH₂Cl | Do. |
| 68 | —CH₃ | —OCH₃ | —CH₂CH₂OCOCH₃ | —CH₂CH₂CN | —NHCOOCH₂CHCl₂ | Do. |
| 69 | —CH₃ | —OCH₃ | —CH₂CH₂OCOCH₃ | —CH₂CH₂COOCH₃ | —NHCOOCH₂CH₂Cl | Do. |
| 70 | —CH₃ | —OCH₃ | —CH₂CH₂COOCH₃ | —CH₂CH₂COOCH₃ | —NHCOOCH₂CH₂Cl | Do. |
| 71 | —CH₃ | —OCH₃ | —CH₂CH₂COOCH₃ | —CH₂CH₂COOCH₃ | —NHCOCH₃ | Do. |
| 72 | —CH₃ | —OCH₃ | —CH₂CH₂COOCH₃ | —CH₂CH₂COOCH₃ | —NHCOCH₃ | Do. |
| 73 | —CH₃ | —OCH₃ | —CH₂CH₂COOCH₃ | —CH₂CH₂CN | —NHCOCH₃ | Do. |
| 74 | —CH₃ | —OCH₃ | —CH₂CH₂COOCH₃ | —CH₂CH₂CN | —NHCOCH₃ | Do. |
| 75 | —CH₃ | —OCH₃ | —CH₂CH₂COOCH₂CH₃ | —CH₂CH₂COOCH₂CH₃ | —NHCOOCH₂CH₂Cl | Do. |
| 76 | —CH₃ | H | —CH₂CH₂COOCH₃ | —CH₂CH₂COOCH₃ | —NHCOCH₃ | Bluish violet. |
| 77 | —CH₃ | H | —CH₂CH₂COOCH₃ | —CH₂CH₂COOCH₃ | —NHCOOCH₂CH₂Cl | Do. |
| 78 | —CH₃ | H | —CH₂CH₂COOCH₃ | —CH₂CH₂OCOCH₃ | —NHCOOCH₂CH₂Cl | Do. |
| 79 | —CH₃ | H | —CH₂CH₂OCOCH₃ | —CH₂CH₂OCOCH₃ | —NHCOOCH₂CH₂Cl | Do. |
| 80 | —CH₃ | —CH₃ | —CH₂CH₂COOCH₃ | —CH₂CH₂COOCH₃ | —NHCOOCH₂CH₂Cl | Blue. |

| Example number | R₁ | R₂ | R₃ | R₄ | R₅ | Shade on Polyester fibre |
|---|---|---|---|---|---|---|
| 81 | —CH₃ | —CH₃ | —CH₂CH₂OCOCH₃ | —CH₂CH₂OCOCH₃ | —NHCOCH₂CH₃ | Do. |
| 82 | —CH₃ | —CH₃ | —CH₂CH₂OCOCH₃ | —CH₂CH₂OCOCH₃ | —NHCOOCH₂CH₃ | Do. |
| 83 | —CH₃ | —CH₃ | —CH₂CH₂OCOCH₃ | —CH₂CH₂OCOCH₃ | —NHCOOCH₂CH₃ | Do. |
| 84 | —CH₃ | —CH₃ | —CH₂CH₂OCOCH₃ | —CH₂CH₂OCOCH₃ | —NHCOOCH₂CH₂Cl | Do. |
| 85 | —CH₃ | —CH₃ | —CH₂CH₂OCOCH₃ | —CH₂CH₂OCOCH₃ | —NHCOOCH₂CH₂OCH₃ | Do. |
| 86 | —CH₃ | —CH₃ | —CH₂CH₂OCOCH₃ | —CH₂CH₂OCOCH₃ | —NHCOOCH₂CHClCH₃ | Do. |
| 87 | —CH₃ | —CH₃ | —CH₂CH₂COOCH₃ | —CH₂CH₂OCOCH₃ | —NHCOOCH₃ | Greenish blue. |
| 88 | —CH₃ | —OCH₃ | —CH₂CH₂OCOCH₃ | —CH₂CH₂OCOCH₃ | —NHCOCH₂CH₃ | Do. |
| 89 | —CH₃ | —OCH₃ | —CH₂CH₂OCOCH₃ | —CH₂CH₂OCOCH₃ | —NHCOOCH₂CH₃ | Do. |
| 90 | —CH₃ | —OCH₃ | —CH₂CH₂OCOCH₃ | —CH₂CH₂OCOCH₃ | —NHCOOCH₂CH₂Cl | Do. |
| 91 | —CH₃ | —OCH₃ | —CH₂CH₂OCOCH₃ | —CH₂CH₂OCOCH₃ | —NHCOOCH₂CH₃ | Do. |
| 92 | —CH₃ | —OCH₃ | —CH₂CH₂OCOCH₃ | —CH₂CH₂OCOCH₃ | —NHCOOCH₂CH₂Cl | Do. |
| 93 | —CH₃ | —OCH₃ | —CH₂CH₂OCOCH₃ | —CH₂CH₂OCOCH₃ | —NHCOOCH₂CH₃ | Do. |
| 94 | —CH₃ | —OCH₃ | —CH₂CH₂OCOCH₃ | —CH₂CH₂OCOCH₃ | —NHCOOCH₂CH₃ | Do. |
| 95 | —CH₃ | —OCH₃ | —CH₂CH₂COCH₃ | —CH₂CH₂OCOCH₃ | —NHCOOCH₂—⬡ | Do. |
| 96 | —CH₃ | —OCH₃ | —CH₂CH₂OCOCH₃ | —CH₂CH₂OCOCH₃ | —NHCOOCH₂CH₃ | Do. |
| 97 | —CH₃ | —OC₂H₅ | —CH₂CH₂OCOCH₃ | —CH₂CH₂OCOCH₃ | —NHCOOCH₂CH₃ | Do. |
| 98 | —CH₃ | —OC₂H₅ | —CH₂CH₂OCOCH₃ | —CH₂CH₂OCOCH₃ | —NHCOOCH₂CH₂Cl | Do. |
| 99 | —CH₃ | —OC₂H₅ | —CH₂CH₂OCOCH₃ | —CH₂CH₂OCOCH₃ | —NHCOOCH₂CH₃ | Do. |
| 100 | —CH₃ | —OC₂H₅ | —CH₂CH₂OCOCH₃ | —CH₂CH₂OCOCH₃ | —NHCOOCH₂CH₃ | Do. |
| 101 | —CH₃ | —OC₂H₅ | —CH₂CH₂OCOCH₃ | —CH₂CH₂OCOCH₃ | —NHCOOCH₂CH₂Cl | Do. |
| 102 | —CH₃ | —CH₃ | —CH₂CH₂OCOCH₃ | —CH₂CH₂OCOCH₃ | —NHCOOCH₂CH₃ | Do. |
| 103 | —CH₃ | —CH₃ | —CH₂CH₂OCOCH₃ | —CH₂CH₂OCOCH₃ | —NHCOOCH₂CH₃ | Do. |
| 104 | —CH₃ | —CH₃ | —CH₂CH₂OCOCH₃ | —CH₂CH₂OCOCH₃ | —NHCOOCH₂CH₃ | Do. |
| 105 | —CH₃ | —CH₃ | —CH₂CH₂OCOCH₃ | —CH₂CH₂OCOCH₂CH₃ | —NHCOOCH₂CH₃ | Do. |
| 106 | —CH₃ | —CH₃ | —CH₂CH₂OCOCH₃ | —CH₂CH₂OCOCH₃ | —NHCOOCH₂CH₃ | Do. |
| 107 | —CH₃ | —CH₃ | —CH₂CH₂OCOCH₃ | —CH₂CH₂OCOCH₃ | —NHCOOCH₂CH₂Cl | Do. |
| 108 | —CH₃ | —H | —CH₂CH₂OCOCH₃ | —CH₂CH₂OCOCH₃ | —NHCOOCH₂CH₃ | Do. |
| 109 | —CH₃ | —OCH₃ | —CH₂CH₂OCOCH₃ | —CH₂CH₂OCOCH₃ | —NHCOOCH₂CH₃ | Blue. |
| 110 | —CH₂CN | —OCH₃ | —CH₂CH₂OCOCH₃ | —CH₂CH₂OCOCH₃ | —OCH₃ | Bluish violet. |
| 111 | —CH₂CN | —OC₂H₅ | —CH₂CH₂OCOCH₃ | —CH₂CH₂OCOCH₃ | —OCH₃ | Greenish blue. |
| 112 | —CH₂CN | —OCH₃ | —CH₂CH₂OCOCH₃ | —CH₂CH₂OCOCH₃ | —NHCOCH₃ | Do. |
| 113 | —CH₂CN | —OCH₃ | —CH₂CH₂OCOCH₃ | —CH₂CH₂COOCH₃ | —NHCOCH₃ | Do. |
| 114 | —CH₂CN | —OCH₃ | —CH₂CH₂OCOCH₃ | —CH₂CH₂CN | —NHCOCH₃ | Do. |
| 115 | —CH₂CN | —OCH₃ | —CH₂CH₂OCOCH₃ | —CH₂CH₂OCOCH₃ | —NHCOCH₃ | Blue. |
| 116 | —CH₂CN | —OCH₃ | —CH₂CH₂OCOCH₃ | —CH₂CH₂OCOCH₃ | —OCH₃ | Do. |
| 117 | —CH₂CN | —OCH₃ | —CH₂CH₂OCOCH₃ | —CH₂CH₂OCOCH₃ | —OCH₃ | Do. |
| 118 | —CH₂CN | —OCH₃ | —CH₂CH₂OCOCH₃ | —CH₂CH₂OCOCH₃ | —NHCOCH₃ | Do. |
| 119 | —OCH₃ | —OCH₃ | —CH₂CH₂OCOCH₃ | —CH₂CH₂OCOCH₃ | | Do. |
| 120 | —CN | | | | | |
| 121 | —CH₂Cl | —OCH₃ | —CH₂CH₂OCOCH₃ | —CH₂CH₂OCOCH₃ | —NHCOOCH₂CH₃ | Do. |
| 122 | —CH₂Cl | —OCH₃ | —CH₂CH₂OCOCH₃ | —CH₂CH₂OCOCH₃ | —OCH₃ | Do. |
| 123 | —CH₂Cl | —OCH₃ | —CH₂CH₂OCOCH₃ | —CH₂CH₂OCOCH₃ | —NHCOOC₂H₅ | Do. |
| 124 | —CH₂Cl | —OCH₃ | —CH₂CH₂OCOCH₃ | —CH₂CH₂OCOCH₂CH₃ | —NHCOOC₂H₅ | Do. |
| 125 | —CH₂Cl | —OCH₃ | —CH₂CH₂OCOCH₃ | —CH₂CH₂OCOCH₃ | —NHCOOCH₂CH₃ | Do. |
| 126 | —CH₂Cl | —OCH₃ | —CH₂CH₂OCOCH₃ | —CH₂CH₂OCOCH₂CH₃ | —OCH₃ | Do. |
| 127 | —CH₂Cl | —OCH₃ | —CH₂CH₂OCOCH₃ | —CH₂CH₂OCOCH₃ | —NHCOOCH₂CH₃ | Do. |
| 128 | —CH₂Cl | —OCH₃ | —CH₂CH₂OCOCH₃ | —CH₂CH₂OCOCH₃ | —NHCOOCH₂CH₃ | Do. |
| 129 | —CH₂CH₂Cl | —OCH₃ | —CH₂CH₂OCOCH₃ | —CH₂CH₂OCOCH₃ | —OCH₃ | Bluish violet. |
| 130 | —CH₂CH₂Cl | —OCH₃ | —CH₂CH₂OCOCH₃ | —CH₂CH₂OCOCH₃ | —NHCOOCH₂CH₃ | Greenish blue. |
| 131 | —CH₂CH₂Cl | —OCH₃ | —CH₂CH₂OCOCH₃ | —CH₂CH₂CN | —OCH₃ | Blue. |
| 132 | —CH₂CH₂Cl | —OCH₃ | —CH₂CH₂OCOCH₃ | —CH₂CH₂OCOCH₃ | —NHCOCH₃ | Do. |
| 133 | —CHClCH₃ | —OCH₃ | —CH₂CH₂OCOCH₃ | —CH₂CH₂CN | —OCH₃ | Do. |
| 134 | —CHClCH₃ | —OCH₃ | —CH₂CH₂OCOCH₃ | —CH₂CH₂CN | —OCH₃ | Do. |
| 135 | —CHClCH₃ | —OCH₃ | —CH₂CH₂OCOCH₃ | —CH₂CH₂OCOCH₃ | —OCH₃ | Do. |
| 136 | —CHClCH₃ | —OCH₃ | —CH₂CH₂OCOCH₃ | —CH₂CH₂OCOCH₃ | —OCH₃ | Do. |

| Example number | R₁ | R₂ | R₃ | R₄ | R₅ | Shade on Polyester fibre |
|---|---|---|---|---|---|---|
| 137 | —CHClCH₃ | —OCH₃ | —CH₂CH₂OCOCH₃ | —CH₂CH₂OCOCH₃ | —NHCOCH₃ | Do. |
| 138 | —CHClCH₃ | —OCH₃ | —CH₂CH₂OCOCH₃ | —CH₂CH₂OCOCH₃ | —NHCOCH₂CH₂Cl | Do. |
| 139 | —CHClCH₃ | —OCH₃ | —CH₂CH₂OCOCH₃ | —CH₂CH₂OCOCH₃ | —NHCOCH₃ | Do. |
| 140 | —CH₃ | —OCH₃ | —CH₂CH₂OCOCH₃ | —CH₂CH₂OCOCH₃ | —OCH₃ | Do. |
| 141 | —CH₃ | —OCH₃ | —CH₂CH₂OCOCH₃ | —CH₂CH₂OCOCH₃ | —OCH₃ | Do. |
| 142 | —CH₃ | —OCH₃ | —CH₂CH₂OCOCH₃ | —CH₂CH₂COOCH₃ | —OCH₃ | Do. |
| 143 | —CH₃ | —OCH₃ | —CH₂CH₂OCOCH₃ | —CH₂CH₂CN | —OCH₃ | Do. |
| 144 | —C₂H₅ | —OCH₃ | —CH₂CH₂OCOCH₃ | —CH₂CH₂OCOCH₂COCH₃ | —NHCOCH₂CH₃ | Bluish violet |
| 145 | —C₂H₅ | H | —CH₂CH₂OCOCH₃ | —CH₂CH₂OCOCH₃ | —NHCOCH₃ | Greenish blue |
| 146 | —C₂H₅ | —OCH₃ | —CH₂CH₂OCOCH₃ | —CH₂CH₂OCOCH₃ | —NHCOCH₂CH₂Cl | Do. |
| 147 | —C₂H₅ | —OCH₃ | —CH₂CH₂OCOCH₃ | —CH₂CH₂OCOCH₃ | —NHCOOCH₃ | Do. |
| 148 | —C₂H₅ | —OCH₃ | —CH₂CH₂OCOCH₃ | —CH₂CH₂OCOCH₃ | —NHCOCHClCH₃ | Do. |
| 149 | —C₂H₅ | —OCH₃ | —CH₂CH₂OCOCH₃ | —CH₂CH₂OCOCH₃ | —NHCOCH₂Cl | Do. |
| 150 | —C₂H₅ | —OCH₃ | —CH₂CH₂OCOCH₃ | —CH₂CH₂OCOCH₃ | —NHCOCHCl₂ | Do. |
| 151 | —C₂H₅ | —OCH₃ | —CH₂CH₂OCOCH₃ | —CH₂CH₂OCOCH₃ | —OCH₃ | Blue. |
| 152 | —C₂H₅ | —OCH₃ | —CH₂CH₂OCOCH₃ | —CH₂CH₂OCOCH₃ | —NHCOOCH₂OCH₂—⌬ | Do. |
| 153 | —C₂H₅ | —OCH₃ | —CH₂CH₂OCOCH₃ | —CH₂CH₂OCOCH₃ | —NHCOCH₃ | Greenish blue. |
| 154 | —C₂H₅ | —OCH₃ | —CH₂CH₂COOCH₃ | —CH₂CH₂COOCH₃ | —NHCOCH₂CH₃ | Do. |
| 155 | —C₂H₅ | —OC₂H₅ | —CH₂CH₂OCOCH₃ | —CH₂CH₂OCOCH₃ | —NHCOCH₂Cl | Do. |
| 156 | —C₂H₅ | —OCH₃ | —CH₂CH₂OCOCH₃ | —CH₂CH₂OCOCH₃ | —OCH₃ | Do. |
| 157 | —C₂H₅ | —OCH₂CH₃ | —CH₂CH₂OCOCH₃ | —CH₂CH₂OCOCH₃ | —OCH₃ | Do. |
| 158 | —C₂H₅ | —OCH₃ | —CH₂CH₂COOCH₃ | —CH₂CH₂COOCH₃ | —OCH₃ | Do. |
| 159 | —C₂H₄ | —OCH₃ | —CH₂CH₂OCOCH₃ | —CH₂CH₂CN | —NHCOCH₂CH₃ | Do. |
| 160 | —CH₂CH₂OH | —OCH₃ | —CH₂CH₂OCOCH₃ | —CH₂CH₂OCOCH₃ | —NHCOCH₃ | Do. |
| 161 | —CH₂CH₂OH | —OCH₃ | —CH₂CH₂OCOCH₃ | —CH₂CH₂OCOCH₃ | —NHCOOCH₂CH₂Cl | Do. |
| 162 | —CH₂CH₂OH | —OCH₃ | —CH₂CH₂OCOCH₃ | —CH₂CH₂COOCH₃ | —NHCOCH₂CH₂Cl | Do. |
| 163 | —CH₂CH₂OH | —OCH₃ | —CH₂CH₂OCOCH₃ | —CH₂CH₂COOCH₃ | —NHCOCH₂Cl | Do. |
| 164 | —CH₂CH₂OH | —OCH₃ | —CH₂CH₂OCOCH₃ | —CH₂CH₂COOCH₃ | —NHCOCH₂CH₃ | Do. |
| 165 | —CH₂CH₂OH | —OCH₃ | —CH₂CH₂OCOCH₃ | —CH₂CH₂COOCH₃ | —NHCOCH₃ | Do. |
| 166 | —CH₂CH₂OH | H | —CH₂CH₂OCOCH₃ | —CH₂CH₂OCOCH₂OCOCH₃ | —OCH₃ | Do. |
| 167 | —CH₂CH₂OH | H | —CH₂CH₂OCOCH₃ | —CH₂CH₂OCOCH₃ | —OCH₃ | Do. |
| 168 | —CH₂CH₂Cl | —OCH₃ | —CH₂CH₂OCOCH₃ | —CH₂CH₂OCOCH₃ | —NHCOCH₃ | Blue. |
| 169 | —CH₂CH₂Cl | —OCH₃ | —CH₂CH₂OCOCH₃ | —CH₂CH₂OCOCH₃ | —NHCOOCH₃ | Do. |
| 170 | —CH₂CH₂Cl | —OCH₃ | —CH₂CH₂OCOCH₃ | —CH₂CH₂OCOCH₃ | —OCH₃ | Bluish violet. |
| 171 | —CH₃ | —OCH₃ | —CH₂CH₂OCOCH₃ | —CH₂CH₂OCOCH₃ | —NHCOOCH₂CH₂Br | Do. |
| 172 | —CH₃ | —OCH₃ | —CH₂CH₂OCOCH₃ | —CH₂CH₂OCOCH₃ | —NHCOOCH₂CH₂Br | Greenish blue. |
| 173 | —CH₃ | —OCH₃ | —CH₂CH₂OCOCH₃ | —CH₂CH₂OCOCH₃ | —NHCOOCH₂CH₂Br | Do. |
| 174 | —CH₃ | —OCH₃ | —CH₂CH₂COOCH₃ | —CH₂CH₂COOCH₃ | —NHCOOCH₂CH₂Br | Do. |
| 175 | —C₂H₅ | —OCH₃ | —CH₂CH₂OCOCH₃ | —CH₂CH₂OCOCH₃ | —NHCOCH₂CH₂Br | Do. |
| 176 | —CH₂CH₂Cl | —OCH₃ | —CH₂CH₂OCOCH₃ | —CH₂CH₂OCOCH₃ | —NHCOOCH₂CH₂Br | Do. |
| 177 | —CH₂CH₂Cl | —OCH₃ | —CH₂CH₂OCOCH₃ | —CH₂CH₂OCOCH₃ | —NHCOOCH₂CH₂Br | Do. |
| 178 | —CH₂CH₂Cl | —OCH₃ | —CH₂CH₂OCOCH₃ | —CH₂CH₂COOCH₃ | —NHCOOCH₂CH₂Br | Do. |
| 179 | —CH₃ | —OCH₃ | —CH₂CH₂OCOCH₃ | —CH₂CH₂COOCH₃ | —NHCOOCH₂CH₂Br | Do. |
| 180 | —CH₃ | —OCH₃ | —CH₂CH₂OCOCH₃ | —CH₂CH₂COOCH₃ | —NHCOOCH₂CH₂Br | Do. |
| 181 | —CH₃ | —OCH₃ | —CH₂CH₂OCOCH₃ | —CH₂CH₂COOCH₃ | —NHCOOCH₂CH₂Br | Do. |
| 182 | —CH₃ | —OCH₃ | —CH₂CH₂OCOCH₃ | —CH₂CH₂COOCH₃ | —NHCOOCH₂CH₂Br | Do. |
| 183 | —CH₃ | —OCH₃ | —CH₂CH₂OCOCH₃ | —CH₂CH₂COOCH₃ | —NHCOOCH₂CH₂Br | Do. |
| 184 | —C₂H₅ | —OCH₃ | —CH₂CH₂OCOCH₃ | —CH₂CH₂COOCH₃ | —NHCOOCH₂CH₂Br | Do. |
| 185 | —CH₂CH₂Cl | —OCH₃ | —CH₂CH₂OCOCH₂OCH₃ | —CH₂CH₂OCOCH₂OCH₃ | —OCH₃ | Do. |
| 186 | —CH₃ | —OCH₃ | —CH₂CH₂OCOCH₃ | —CH₂CH₂OCOCH₃ | —NHCOCH₃ | Do. |
| 187 | —CH₃ | —OCH₃ | —CH₂CH₂OCOCH₂CH₃ | —CH₂CH₂OCOCH₂CH₃ | —NHCOOCH₂CH₃ | Do. |
| 188 | —CH₃ | —OCH₂CH₃ | —CH₂OH₂OCOCH₃ | —CH₂OH₂OCOCH₃ | —NHCOCH₃ | Do. |
| 189 | —CH₃ | —OCH₂CH₃ | —CH₂CH₂OCOCH₃ | —CH₂OH₂OCOCH₃ | —NHCOCH₂CH₃ | Do. |
| 190 | —C₂H₅ | —OCH₂CH₃ | —CH₂CH₂OCOCH₃ | —CH₂OH₂OCOCH₃ | —NHCOCH₃ | Blue. |
| 191 | —CH₃ | —OCH₂CH₃ | —CH₂CH₂OCOCH₃ | —CH₂OH₂OCOCH₃ | —NHCOCH₂CH₂CH₃ | Do. |
| 192 | —CH₃ | —OCH₂CH₃ | —CH₂CH₂OCOCH₃ | —CH₂OH₂OCOCH₃ | —NHCOCH₃ | Do. |
| 193 | —CH₃ | —OCH₂CH₃ | —CH₂CH₂OCOCH₃ | —CH₂OH₂OCOCH₃ | —NHCOCH₂CH₂CH₃ | Do. |
| 194 | —CH₃ | —OCH₂CH₃ | —CH₂CH₂OCOCH₃ | —CH₂CH₂OCOCH₃ | —NHCOCHCH₂CH₃, Cl | Do. |

| Example number | R₁ | R₂ | R₃ | R₄ | R₅ | Shade on Polyester fibre |
|---|---|---|---|---|---|---|
| 195 | CH₃ | —OCH₂CH₃ | —CH₂CH₂OCOCH₃ | —CH₂CH₂OCOCH₃ | —NHCOCH₂CHCH₂Cl | Do. |
| 196 | —CH₃ | —OCH₂CH₃ | —CH₂CH₂OCOCH₃ | —CH₂CH₂OCOCH₃ | —NHCOCH₂CH₂CH₂Cl | Do. |
| 197 | —CH₃ | —OCH₂CH₃ | —CH₂CH₂OCOCH₃ | —CH₂CH₂OCOCH₃ | —NHCOCH₂CH₂CH₂Cl | Do. |
| 198 | —CH₂Cl | —OCH₃ | —CH₂CH₂OCOCH₂CH₃ | —CH₂CH₂OCOCH₃ | —NHCOCH₂CH₂CH₂Cl | Do. |
| 199 | —CH₃ | —OCH₃ | —CH₂CH₂OCOCH₃ | —CH₂CH₂CN | —NHCOCH₂CH₂CH₃ | Do. |
| 200 | —CH₃ | —OCH₂CH₃ | —CH₂CH₂OCOCH₃ | —CH₂CH₂OCOCH₃ | —NHCOCH₂CHCH₂—OCH₃ | Do. |
| 201 | —CH₃ | —OCH₂CH₃ | —CH₂CH₂OCOCH₃ | —CH₂CH₂OCOCH₃ | —NHCOCH₂CH₂OCH₃ | Do. |
| 202 | —CH₃ | —OCH₂CH₃ | —CH₂CH₂OCOCH₃ | —CH₂CH₂OCOCH₃ | —NHCOCH₂CH₂OCH₃ | Do. |
| 203 | —CH₃ | —OCH₂CH₃ | —CH₂CH₂OCOCH₃ | —CH₂CH₂CH₂OCH₃ | —NHCOCH₂CH₂CN | Do. |
| 204 | —CH₂CH₃ | —OCH₃ | —CH₂CH₂OCOCH₃ | —CH₂CH₂OCOCH₃ | —NHCOCHCH₂OCH₃—CN | Do. |
| 205 | —CH₂CH₃ | —OCH₃ | —CH₂CH₂OCOCH₃ | —CH₂CH₂OCOCH₃ | —NHCOCH₂CH₂O—⌬ | Do. |
| 206 | —CH₃ | —OCH₃ | —CH₂CH₂OCOCH₃ | —CH₂CH₂OCOCH₃ | —NHCOCH₂CH₂O—⌬ | Do. |
| 207 | —CH₃ | —OCH₂CH₃ | —CH₂CH₂OCOOCH₃ | —CH₂CH₂OCOOCH₃ | —NHCOCH₂CH₂Cl | Do. |
| 208 | —CH₃ | —OCH₂CH₃ | —CH₂CH₂OCOOCH₃ | —CH₂CH₂OCOOCH₃ | —NHCOCH₂CH₃ | Do. |
| 209 | —CH₃ | —OCH₂CH₃ | —CH₂CH₂OCOCH₃ | —CH₂CH₂CN | —NHCOCH₂CH₂OCH₃ | Do. |
| 210 | —CH₃ | —OCH₂CH₃ | —CH₂CH₂OCOCH₃ | —CH₂CH₂CN | —NHCOCH₂CH₂OCH₃ | Do. |
| 211 | —CH₃ | —OCH₂CH₃ | —CH₂CH₂OCOCH₃ | —CH₂CH₂CN | —NHCOCH₂CH₂OCH₃Cl | Do. |
| 212 | —CH₃ | —OCH₃ | —CH₂CH₂OCOCH₃ | —CH₂CH₂CN | —NHCOCH₂CH₂O—⌬ | Do. |
| 213 | —CH₃ | —OCH₂CH₃ | —CH₂CH₂OCOOCH₂CH₂Br | —CH₂CH₂CN | —NHCOCH₃ | Do. |
| 214 | —CH₃ | —OCH₂CH₃ | —CO₂CH₂OCOOCH₂CH₂Br | —CH₂CH₂OCOOCH₃ | —NHCOCH₃ | Do. |
| 215 | —CH₃ | —OCH₂CH₃ | —CH₂CH₂OCOOCH₂CH₂Br | —CH₂CH₂OCOOCH₃ | —NHCOCH₃ | Do. |
| 216 | —CH₃ | —OCH₂CH₃ | —CH₂CH₂OCOOCH₂CH₂Br | —CH₂CH₂OCOOCH₃ | —NHCOCH₃ | Do. |
| 217 | —CH₃ | —OCH₂CH₃ | —CH₂CH₂OCOOCH₂CH₂Br | —CH₂CH₂OCOOCH₃ | —NHCOCH₃ | Greenish blue. |
| 218 | —CH₃ | —OCH₂CH₃ | —CH₂CH₂OCOOCH₃ | —CH₃ | —NHCOCH₃ | Do. |
| 219 | —C₂H₅ | —OCH₂CH₃ | —CH₂CH₂OCOOCH₃ | —CH₃ | —NHCOCH₂CH₃ | Do. |
| 220 | —CH₃ | —OCH₂CH₃ | —CH₂OCH₂OCOOCH₃ | —CH₃ | —OCH₂CH₃ | Do. |
| 221 | —CH₃ | —OCH₂CH₃ | —CH₂CH₂OCOOCH₃ | —CH₃ | —OCH₂CH₃ | Do. |
| 222 | —CH₃ | —OCH₂CH₃ | —CH₂CH₂OCOOCH₃ | —CH₂CH₂CH₂CH₃ | —OCH₂CH₃ | Do. |
| 223 | —CH₃ | —OCH₂CH₃ | —CH₂CH₂OCOOCH₃ | —CH₂CH₂CH₂Cl | —OCH₂CH₃ | Blue. |
| 224 | —CH₂Cl | —OCH₂CH₃ | —CH₂CH₂OCOOCH₃CH₃ | —CH₂CH₂CH₂OCOCH₃ | —OCH₂CH₃ | Do. |
| 225 | —CH₃ | —OCH₂CH₃ | —CH₂CH₂OCOOCH₃ | —CH₂CH₂OCOCH₃ | —OCH₂CH₃ | Do. |
| 226 | —CH₃ | —OCH₂CH₃ | —CH₂CH₂OCOOCH₃ | —CH₂CH₂OCOCH₃ | —OCH₂CH₃ | Do. |
| 227 | —CH₃ | —OCH₂CH₃ | —CH₂CH₂OCOOCH₃ | —CH₂CH₂COCH₃ | —OCH₂CH₃ | Do. |
| 228 | —CH₃ | —OCH₂CH₃ | —CH₂CH₂OCOOCH₂OCH₃ | —CH₂CH₂OCOCH₃ | —OCH₂CH₃ | Do. |
| 229 | —CH₃ | —OCH₂CH₃ | —CH₂CH₂OCOOCH₃ | —CH₂CH₂OCOCH₃ | —OCH₂CH₃ | Do. |
| 230 | —CH₃ | —OCH₂CH₃ | —CH₂CH₂OCOOCH₃ | —CH₂CH₂CN | —OCH₂CH₃ | Do. |
| 231 | —CH₃ | —OCH₂CH₃ | —CH₂CH₂OCOOCH₃ | —CH₂CH₂CN | —OCH₂CH₃ | Do. |
| 232 | —CH₃ | —CH₃ | —CH₂CH₂OCOOCH₃ | —CH₂CH₂CN | —NHCOCH₃ | Do. |

| Example number | $R_1$ | $R_2$ | $R_3$ | $R_4$ | $R_5$ | Shade on Polyester fibre |
|---|---|---|---|---|---|---|
| 233 | —CH₃ | —C₂H₅ | —CH₂CH₂OCOCH₃ | —CH₂CH₂OCOCH₃ | —NHCOOCH₃ | Do. |
| 234 | —CH₃ | —C₂H₅ | —CH₂CH₂OCOCH₃ | —CH₂CH₂OCOCH₃ | —NHCOOCH₂CH₂Cl | Do. |
| 235 | —CH₃ | —C₂H₅ | —CH₂CH₂OCOCH₃ | —CH₂CH₂OCOCH₃ | —NHCOOCH₂CH₂Br | Do. |
| 236 | —CH₃ | —C₂H₅ | —CH₂CH₂OCOCH₃ | —CH₂CH₂OCOCH₃ | —NHCOOCH₂CH₂CH₃ | Do. |
| 237 | —CH₃ | —C₂H₅ | —CH₂CH₂OCOCH₃ | —CH₂CH₂OCOCH₃ | —NHCOOCH₂CH₃ | Do. |
| 238 | —CH₃ | —C₂H₅ | —CH₂CH₂OCOCH₃ | —CH₂CH₂OCOCH₃ | —NHCOOCH₂O—⌬ | Do. |
| 239 | —CH₃ | —C₂H₅ | —CH₂CH₂OCOCH₃ | —CH₂CH₂OCOCH₃ | —NHCOOCH₃ | Do. |
| 240 | —CH₃ | —C₂H₅ | —CH₂CH₂OCOCH₃ | —CH₂CH₂OCOCH₃ | —NHCOOCH₂CH₂Cl | Do. |
| 241 | —CH₃ | —C₂H₅ | —CH₂CH₂OCOCH₃ | —CH₂CH₂OCOCH₃ | —NHCOOCH₂CH₂Cl | Do. |
| 242 | —CH₃ | —C₂H₅ | —CH₂CH₂OCOCH₃ | —CH₂CH₂OCOCH₃ | —NHCOOCH₂OCH₂—⌬ | Do. |
| 243 | —CH₃ | —C₂H₅ | —CH₂CH₂OCOCH₃ | —CH₂CH₂CN | —NHCOOCH₃ | Do. |
| 244 | —CH₃ | —C₂H₅ | —CH₂CH₂OCOCH₃ | —CH₂CH₂OCOCH₃ | —NHCOOCH₃ | Do. |
| 245 | —CH₃ | —C₂H₅ | —CH₂CH₂OCOCH₃ | —CH₂CH₂COOCH₃ | —NHCOOCH₃ | Do. |
| 246 | —CH₃ | —C₂H₅ | —CH₂CH₂OCOCH₃ | —CH₂CH₂CN | —NHCOOCH₃ | Do. |
| 247 | —CH₃ | —C₂H₅ | —CH₂CH₂OCOOCH₃ | —CH₂CH₂OCOCH₃ | —NHCOOCH₃ | Do. |
| 248 | —CH₃ | —C₂H₅ | —CH₂CH₂OCOOCH₂CH₃ | —CH₂CH₂OCOOCH₂CH₃ | —NHCOOCH₃ | Do. |
| 249 | —CH₃ | —C₂H₅ | —CH₂CH₂OCOOCH₂CH₂Cl | —CH₂CH₂OCOOCH₂CH₂Cl | —NHCOOCH₂CH₂Cl | Do. |
| 250 | —CH₃ | —C₂H₅ | —CH₂CH₂OCOOCH₂CH₂Cl | —CH₂CH₂OCOOCH₂CH₂Cl | —NHCOOCH₃ | Do. |
| 251 | —CH₃ | —OCH₂CH₃ | —CH₂CH₂OCOOCH₂CH₂Cl | —CH₂CH₂OCOOCH₂CH₂Cl | —NHCOOCH₃ | Do. |
| 252 | —CH₂CH₃ | —OCH₃ | —CH₂CH₂OCOOCH₂CH₂Cl | —CH₂CH₂OCOOCH₂CH₂Cl | —NHCOOCH₃ | Do. |
| 253 | —CH₂CH₃ | —OCH₃ | —CH₂CH₂OCOOCH₂CH₂Cl | —CH₂CH₂OCOOCH₂CH₂Cl | —NHCOOCH₂CH₂Cl | Do. |
| 254 | —CH₂CH₃ | —OCH₃ | —CH₂CH₂OCOOCH₂CH₂Cl | —CH₂CH₂OCOOCH₂CH₂Cl | —NHCOOCH₂CH₃ | Do. |
| 255 | —CH₃ | —OCH₂CH₃ | —CH₂CH₂OCOOCH₂CH₂Cl | —CH₂CH₂OCOOCH₂CH₂Cl | —NHCOOCH₃ | Do. |
| 256 | —CH₃ | —OCH₃ | —CH₂CH₂OCOOCH₂CH₂CH₃ | —CH₂CH₂OCOOCH₂CH₂CH₃ | —NHCOOCH₃ | Do. |
| 257 | —CH₃ | —OCH₃ | —CH₂CH₂OCOOCH₂CH₂CH₃ | —CH₂CH₂OCOOCH₂CH₂CH₃ | —NHCOOCH₂CH₃ | Do. |
| 258 | —CH₃ | —OCH₃ | —CH₂CH₂OCOCH₃ | —CH₂CH₂CN | —NHCOOCH₂CH₃ | Do. |
| 259 | —CH₃ | —OCH₃ | —CH₂CH₂OCOCH₃ | —CH₂CH₂CN | —NHCOOCH₃ | Do. |
| 260 | —CH₃ | —OCH₃ | —CH₂CH₂OCOCH₃ | —CH₂CH₂CN | —OCH₃ | Do. |
| 261 | —CH₃ | —OCH₃ | —CH₂CH₂OCOCHCH₃ (OCH₃) | —CH₂CH₂CN | —NHCOOCH₃ | Greenish blue. |
| 262 | —CH₃ | —OCH₃ | —CH₂CH₂OCOCHCH₃ (OCH₃) | —CH₂CH₂CN | —NHCOOCH₃ | Blue. |
| 263 | —CH₃ | —OCH₃ | —CH₂CH₂OCOCH₃ | —CH₂CH₂CN | —NHCOOCH₃ | Do. |
| 264 | —CH₃ | —OCH₂CH₃ | —CH₂CH₂OCOCH₂CHCH₃ (OCH₃) | —CH₂CH₂OCOCH₂CHCH₃ (OCH₃) | —NHCOOCH₃ | Do. |
| 265 | —CH₃ | —OCH₂CH₃ | —CH₂CH₂OCOCH₂OCH₃ | —CH₂CH₂OCOCH₂OCH₃ | —NHCOOCH₃ | Do. |
| 266 | —CH₂CN | —OCH₂CH₃ | —CH₂CH₂OCOCH₂OCH₃ | —CH₂CH₂OCOCH₂OCH₃ | —NHCOOCH₃ | Do. |
| 267 | —CH₂Cl | —OCH₃ | —CH₂CH₂OCOCH₂OCH₃ | —CH₂CH₂OCOCH₂OCH₃ | —NHCOOCH₃ | Do. |
| 268 | —CH₃ | —OCH₃ | —CH₂CH₂OCOCH₂OCH₃ | —CH₂CH₂OCOCH₂OCH₃ | —NHCOOCH₃ | Do. |
| 269 | —CH₃ | —OCH₃ | —CH₂CH₂OCOCH₂OCH₃ | —CH₂CH₂OCOCH₂OCH₃ | —COH.CH₃ | Do. |
| 270 | —CH₃ | —OCH₃ | —CH₂CH₂OCOCH₂OCH₃ | —CH₂CH₂OCOCH₂OCH₃ | —NHCOOCH₃ | Do. |
| 271 | —CH₃ | —OCH₃ | —CH₂CH₂OCOCH₂OCH₃ | —CH₂CH₂OCOCH₂OCH₃ | —NHCOOCH₃ | Do. |
| 272 | —CH₃ | —OCH₃ | —CH₂CH₂OCOCH₂OCH₃ | —CH₂CH₂OCOCH₂OCH₃ | —NHCOOCH₃ | Do. |
| 273 | —CH₃ | —OCH₃ | —CH₂CH₂OCOCHCH₃Br | —CH₂CH₂OCOCH₂CH₂Br | —NHCOOCH₂CH₂Br | Do. |
| 274 | —CH₃ | —OCH₃ | —CH₂CH₂OCOCH₂OCH(CH₃)₂ | —CH₂CH₂OCOCH₂OCH(CH₃)₂ | —NHCOOCH₃ | Do. |
| 275 | —CH₃ | —OCH₃ | —CH₂CH₂OCOCH₂Cl | —CH₂CH₂CN | —NHCOOCH₃ | Do. |
| 276 | —CH₃ | —OCH₂CH₃ | —CH₂CH₂OCOCH₂Br | —CH₂CH₂CN | —NHCOOCH₃ | Do. |
| 277 | —CH₃ | —OCH₂CH₃ | —CH₂CH₂OCOCH₂Br | —CH₂CH₂OCOCH₂Br | —NHCOOCH₃ | Do. |
| 278 | —CH₃ | —OCH₂CH₃ | —CH₂CH₂OCOCH₃ | —CH₂CH₂CN | —NHCOOCH₃ | Do. |
| 279 | —CH₃ | —OCH₂CH₃ | —CH₂CH₂OCOCH₃ | —CH₂CH₂CN | —NHCOOCH₃ | Do. |

| Example number | $R_1$ | $R_2$ | $R_3$ | $R_4$ | $R_5$ | Shade on Polyester fibre |
|---|---|---|---|---|---|---|
| 280 | —CH$_3$ | —OCH$_3$ | —CH$_2$CH$_2$OCOCH$_3$ | —CH$_2$CH$_2$CN | —NHCOCH$_3$ | Do. |
| 281 | —CH$_3$ | —OCH$_3$ | —CH$_2$CH$_2$OCOCH$_3$ | —CH$_2$CH$_2$OCOCH$_2$Br | —NHCOCH$_3$ | Do. |
| 282 | —CH$_3$ | —OCH$_3$ | —CH$_2$CH$_2$OCOCH$_2$CH$_2$Br | —CH$_2$CH$_2$OCOCH$_2$CH$_2$Br | —NHCOCH$_3$ | Do. |
| 283 | —CH$_3$ | —OCH$_2$CH$_3$ | —CH$_2$CH$_2$OCOCH$_2$CH$_2$Br | —CH$_2$CH$_2$OCOCH$_2$CH$_2$Br | —NHCOCH$_3$ | Do. |
| 284 | —CH$_3$ | —OCH$_2$CH$_3$ | —CH$_2$CH$_2$OCOCH$_2$CH$_2$Cl | —CH$_2$CH$_2$OCOCH$_2$CH$_2$Br | —NHCOCH$_3$ | Do. |
| 285 | —CH$_3$ | —OCH$_2$CH$_3$ | —CH$_2$CH$_2$OCOCH$_2$CH$_2$Cl | —CH$_2$CH$_2$CN | —NHCOCH$_3$ | Do. |
| 286 | —CH$_3$ | —OCH$_2$CH$_3$ | —CH$_2$CH$_2$OCOCH$_2$CH$_2$Cl | —CH$_2$CH$_2$CN | —NHCOCH$_3$ | Do. |
| 287 | —CH$_3$ | —OCH$_2$CH$_3$ | —CH$_2$CH$_2$OCOCH$_2$Cl | —CH$_2$CH$_2$OCOCH$_2$Cl | —NHCOCH$_2$— ⌬ | Do. |
| 288 | —CH$_3$ | —OCH$_2$CH$_3$ | —CH$_2$CH$_2$OCOCH$_2$Cl | —CH$_2$CH$_2$OCOCH$_2$Cl | —NHCOCH$_3$ | Do. |
| 289 | —CH$_3$ | —OCH$_2$CH$_3$ | —CH$_2$CH$_2$OCOCH$_2$Cl | —CH$_2$CH$_2$OCOCH$_2$Cl | —NHCOCH$_2$CH$_3$ | Do. |
| 290 | —CH$_3$Cl | —OCH$_3$ | —CH$_2$CH$_2$OCOCH$_2$Cl | —CH$_2$CH$_2$OCOCH$_2$Cl | —NHCOOCH$_3$ | Do. |
| 291 | —CH$_3$Cl | —OCH$_3$ | —CH$_2$CH$_2$OCOCH$_2$Cl | —CH$_2$CH$_2$OCOCH$_2$Cl | —NHCOOCH$_3$ | Do. |
| 292 | —CH$_2$CN | —OCH$_3$ | —CH$_2$CH$_2$OCOCH$_2$Cl | —CH$_2$CH$_2$OCOCH$_2$Cl | —NHCOCH$_3$ | Do. |
| 293 | —CH$_3$ | —OCH$_3$ | —CH$_2$CH$_2$OCOCH$_2$Cl | —CH$_2$CH$_2$OCOCH$_2$Cl | —NHCO— ⌬ | Do. |
| 294 | —CH$_2$Br | —OCH$_3$ | —CH$_2$CH$_2$OCOCH$_2$Cl | —CH$_2$CH$_2$OCOCH$_2$Cl | —NHCO— ⌬ | Do. |
| 295 | —CH$_2$Br | —OCH$_3$ | —CH$_2$CH$_2$OCOCH$_3$ | —CH$_2$CH$_2$OCOCH$_3$ | NHCOCH$_3$ | Do. |
| 296 | —CH$_2$Br | —OCH$_3$ | —CH$_2$CH$_2$OCOCH$_3$ | —CH$_2$CH$_2$OCOCH$_3$ | —NHCOCH$_2$CH$_3$ | Do. |
| 297 | —CH$_2$Br | —OCH$_3$ | —CH$_2$CH$_2$OCOCH$_3$ | —CH$_2$CH$_2$OCOCH$_3$ | —NHCOCH$_2$CH$_3$ | Do. |
| 298 | —CH$_2$Br | —OCH$_3$ | —CH$_2$CH$_2$OCOCH$_3$ | —CH$_2$CH$_2$OCOCH$_3$ | —NHCOCH$_2$CH$_2$Br | Do. |
| 299 | —CH$_2$Br | —OCH$_3$ | —CH$_2$CH$_2$OCOCH$_3$ | —CH$_2$CH$_2$OCOCH$_3$ | —NHCOCH$_2$CH$_2$Cl | Do. |
| 300 | —CH$_2$Br | —OCH$_3$ | —CH$_2$CH$_2$OCOCH$_3$ | —CH$_2$CH$_2$OCOCH$_3$ | —NHCOCH$_2$CHCl$_2$ | Do. |
| 301 | —CH$_2$Br | —OCH$_3$ | —CH$_2$CH$_2$OCOCH$_3$ | —CH$_2$CH$_2$OCOCH$_3$ | —NHCOCH$_2$OCH$_3$ | Do. |
| 302 | —CH$_2$Br | —OCH$_2$CH$_3$ | —CH$_2$CH$_2$OCOCH$_3$ | —CH$_2$CH$_2$OCOCH$_3$ | —NHCOCH$_2$OCH$_2$— ⌬ | Do. |
| 303 | —CH$_2$Br | —OCH$_2$CH$_3$ | —CH$_2$CH$_2$OCOCH$_3$ | —CH$_2$CH$_2$CN | —NHCOCH$_2$OCH$_2$— ⌬ | Do. |
| 304 | —CH$_2$Br | —OCH$_2$CH$_3$ | —CH$_2$CH$_2$OCOCH$_3$ | —CH$_2$CH$_2$CN | —NHCOOCH$_2$CH$_3$ | Do. |
| 305 | —CH$_2$Br | —OCH$_2$CH$_3$ | —CH$_2$CH$_2$OCOCH$_3$ | —CH$_2$CH$_2$CN | —NHCOOCH$_2$CH$_2$Cl | Do. |
| 306 | —CH$_2$Br | —OCH$_2$CH$_3$ | —CH$_2$CH$_2$OCOCH$_3$ | —CH$_2$CH$_2$COOCH$_3$ | —NHCOOCH$_3$ | Do. |
| 307 | —CH$_2$Br | —OCH$_2$CH$_3$ | —CH$_2$CH$_2$COOCH$_3$ | —CH$_2$CH$_2$COOCH$_3$ | —OCH$_2$CH$_3$ | Do. |
| 308 | —CH$_2$Br | —OCH$_2$CH$_3$ | —CH$_2$CH$_2$OCOCH$_3$ | —CH$_2$CHCl$_2$ | —NHCOCH$_3$ | Do. |
| 309 | —CHCH$_3$Br | —OCH$_2$CH$_3$ | —CH$_2$CH$_2$OCOCH$_3$ | —CH$_2$CH$_2$OCOCH$_3$ | —NHCOCH$_3$ | Do. |
| 310 | —CHCH$_3$Br | —OCH$_2$CH$_3$ | —CH$_2$CH$_2$OCOCH$_3$ | —CH$_2$CH$_2$OCOCH$_3$ | —NHCOCH$_3$ | Do. |
| 311 | —CHCH$_3$Br | —OCH$_2$CH$_3$ | —CH$_2$CH$_2$OCOCH$_3$ | —CH$_2$CH$_2$OCOCH$_3$ | —NHCOCH$_2$OCH$_2$CH$_3$ | Do. |
| 312 | —CHCH$_3$Br | —OCH$_2$CH$_3$ | —CH$_2$CH$_2$OCOCH$_3$ | —CH$_2$CH$_2$OCOCH$_3$ | —NHCOOCH$_2$CH$_3$ | Do. |

Formulae of representative dyes of the foregoing examples are as follows:

Example 4:

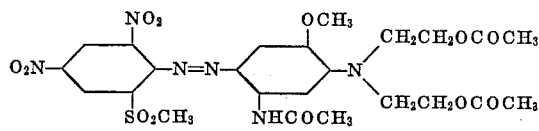

Example 1:

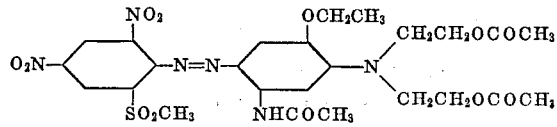

Example 5:

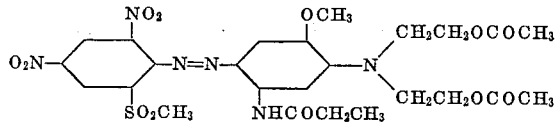

Example 21:

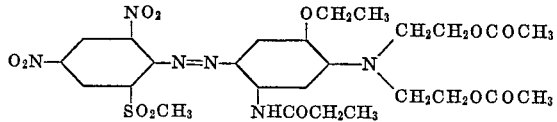

Example 188:

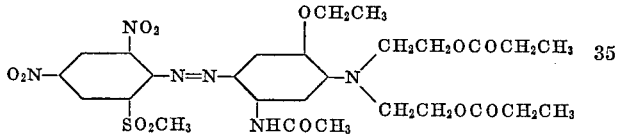

Example 6:

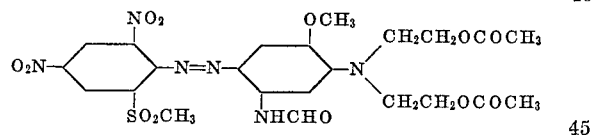

Example 189:

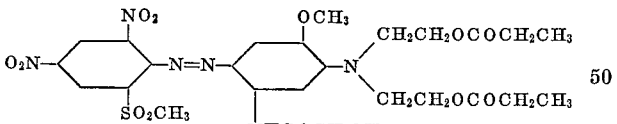

Example 3:

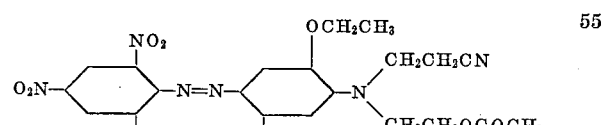

Example 2:

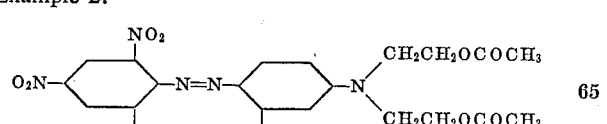

Example 160:

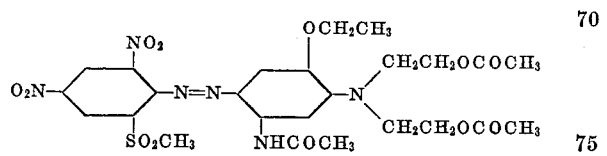

Example 10:

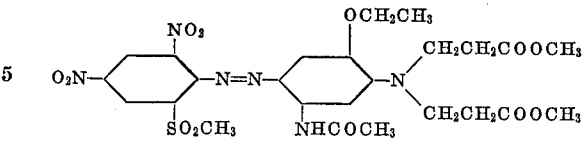

Example 15:

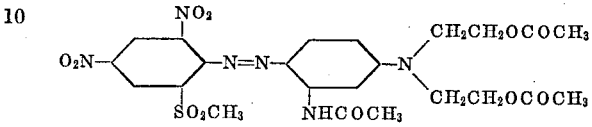

Example 190:

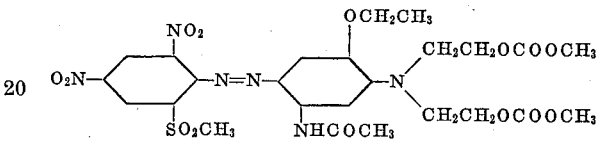

Example 59:

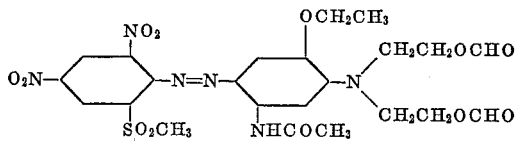

Having thus disclosed the invention, what we claim is:
1. An azo dye of the formula

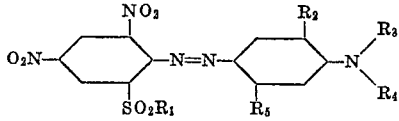

wherein:
$R_1$ is a member selected from the group consisting of methyl, halomethyl, cyanomethyl, hydroxymethyl, ethyl, haloethyl, cyanoethyl and hydroxyethyl;

$R_2$ is a member selected from the group consisting of a hydrogen atom, methyl, ethyl, methoxy and ethoxy;

$R_3$ is a member selected from the group consisting of alkylcarbonylalkyl, acyloxyalkyl, haloacyloxyalkyl, cyanoacyloxyalkyl, alkoxyacyloxyalkyl, acylacyloxyalkyl, alkoxycarbonylalkyl, haloalkoxycarbonylalkyl, cyanoalkoxycarbonylalkyl, alkoxyalkoxycarbonylalkyl, acylalkoxycarbonylalkyl, alkoxycarbonyloxyalkyl, haloalkoxycarbonylalkyl, cyanoalkoxycarbonyloxyalkyl, alkoxyalkoxycarbonyloxyalkyl and acylalkoxycarbonyloxyalkyl;

$R_4$ is a member selected from the group consisting of cyanoalkyl, acyloxyalkyl, haloacyloxyalkyl, cyanoacyloxyalkyl, alkoxyacyloxyalkyl, acylacyloxyalkyl, alkoxycarbonylalkyl, haloalkoxycarbonylalkyl, cyanoalkoxycarbonylalkyl, alkoxyalkoxycarbonylalkyl, acylalkoxycarbonylalkyl, alkoxycarbonyloxyalkyl, haloalkoxycarbonyloxyalkyl, cyanoalkoxycarbonyloxyalkyl, alkoxyalkoxycarbonyloxyalkyl and acylalkoxycarbonyloxyalkyl; and $R_5$ is a member selected from the group consisting of alkoxy, acylamino, haloacylamino, alkoxyacylamino, aralkoxyacylamino, alkoxycarbonylamino, haloalkoxycarbonylamino, alkoxyalkoxycarbonylamino, aralkoxyalkoxycarbonylamino, aryloxyalkoxycarbonylamino, aralkoxycarbonylamino, haloaralkoxycarbonylamino, alkoxyaralkoxycarbonylamino, aralkoxyaralkoxycarbonylamino, aryloxyaralkoxycarbonylamino, aryloxycarbonylamino, haloaryloxycarbonylamino, alkoxyaryloxycarbonylamino, aralkoxyaryloxycarbonylamino, and aryloxyaryloxycarbonylamino;

each alkyl and the alkyl of each alkoxy being lower alkyl, each acyl being a member selected from the group consisting of formyl, lower alkanoyl and, for $R_5$, also benzoyl, and each aryl being phenyl.

2. A dye according to claim 1 of the formula

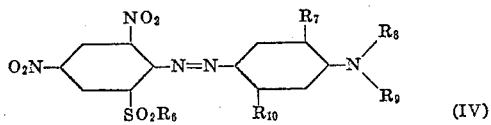

(IV)

wherein:
- $R_6$ is a member selected from the group consisting of methyl, ethyl, chloromethyl, cyanomethyl, bromomethyl, bromoethyl, chloroethyl, cyanoethyl and hydroxyethyl,
- $R_7$ is a member selected from the group consisting of hydrogen, methyl, ethyl, methoxy and ethoxy,
- $R_8$ is a member selected from the group consisting of acetylethyl, formyloxyethyl, methoxycarbonylethyl, ethoxycarbonylethyl, acetoxyethyl, chloro- and bromoacetoxyethyl, cyanoacetoxyethyl, methoxyacetoxyethyl, ethoxyacetoxyethyl, propyloxyacetoxyethyl, acetoxyacetoxyethyl, methoxycarbonyloxyethyl, ethoxycarbonyloxyethyl, chloro- and bromo-ethoxycarbonyloxyethyl, propylcarbonyloxyethyl, acetoacetoxyethyl, methoxycarbonyloxyethyl, ethoxycarbonyloxyethyl, chloro- and bromo-ethoxycarbonyloxyethyl, propylcarbonyloxyethyl, propionyloxyethyl, methoxypropionyloxyethyl, ethoxypropionyloxyethyl and methoxybutryloxyethyl,
- $R_9$ is a member selected from the group consisting of cyanoethyl, formyloxyethyl, methoxycarbonylethyl, ethoxycarbonylethyl, acetoxyethyl, chloro- and bromo-acetoxyethyl, cyanoacetoxyethyl, methoxyacetoxyethyl, ethoxyacetoxyethyl, propyloxyacetoxyethyl, acetoxyacetoxyethyl, methoxycarbonyloxyethyl, ethoxycarbonyloxyethyl, chloro- and bromo-ethoxycarbonyloxyethyl, propylcarbonyloxyethyl, acetoacetoxyethyl, methoxycarbonyloxyethyl, ethoxycarbonyloxyethyl, chloro- and bromo-ethoxycarbonyloxyethyl, propylcarbonyloxyethyl, propionyloxyethyl, methoxypropionyloxyethyl, ethoxypropionyloxyethyl, chloro- and bromo-propionyloxyethyl, cyanopropionyloxyethyl and methoxybutryloxyethyl, and
- $R_{10}$ is a member selected from the group consisting of methoxy, ethoxy, formylamino, acetylamino, chloroacetylamino, methoxylacetylamino, ethoxyacetylamino, phenyloxyacetylamino, methoxycarbonylamino, ethoxycarbonylamino, chloro- and bromo-ethoxycarbonylamino, methoxymethoxycarbonylamino, ethoxymethylcarbonylamino, phenylmethylcarbonylamino, tertiary butylcarbonylamino, phenyloxyacetylamino, phenylmethoxycarbonylamino, phenylmethoxymethoxycarbonylamino, propionylamino, mono- and di-chloropropionylamino, bromopropionylamino, butyrylamino, mono- and di-chloro-butyrylamino, methoxybutyrylamino, cyanobutyrylamino, phenyloxybutyrylamino and benzoylamino.

3. The dye according to claim 2 of the formula

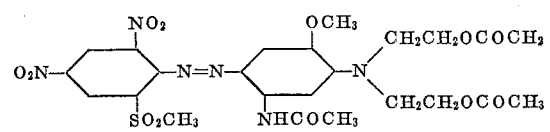

4. The dye according to claim 2 of the formula

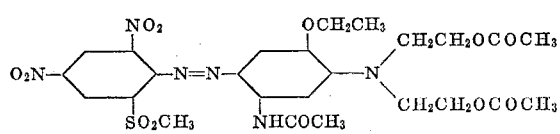

5. The dye according to claim 2 of the formula

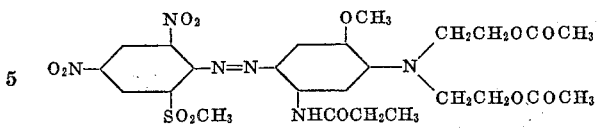

6. The dye according to claim 2 of the formula

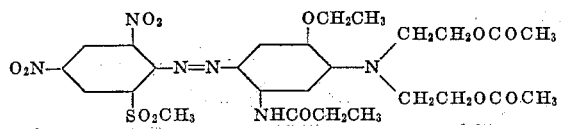

7. The dye according to claim 2 of the formula

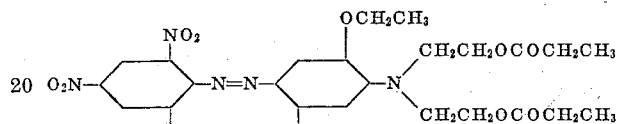

8. The dye according to claim 2 of the formula

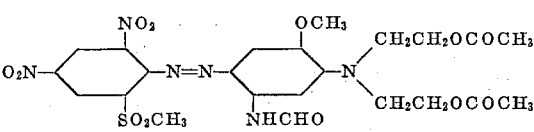

9. The dye according to claim 2 of the formula

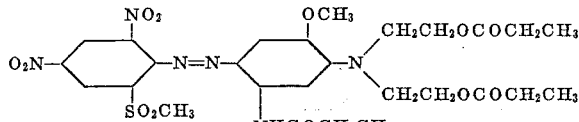

10. The dye according to claim 2 of the formula

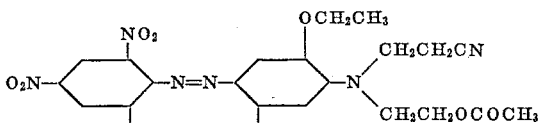

11. The dye according to claim 2 of the formula

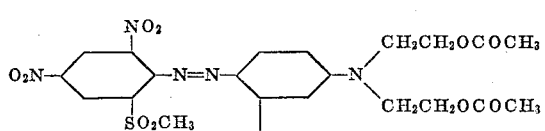

12. The dye according to claim 2 of the formula

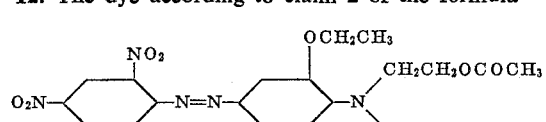

13. The dye according to claim 2 of the formula

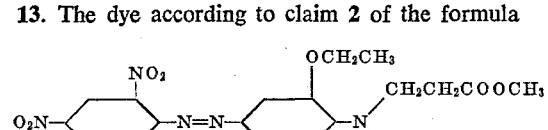

14. The dye according to claim 2 of the formula

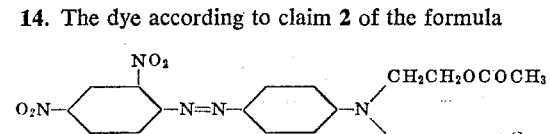

15. The dye according to claim 2 of the formula
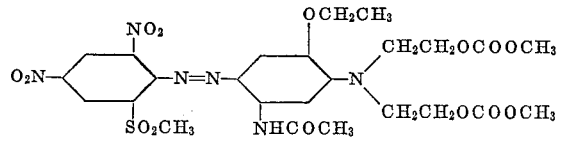
16. The dye according to claim 2 of the formula
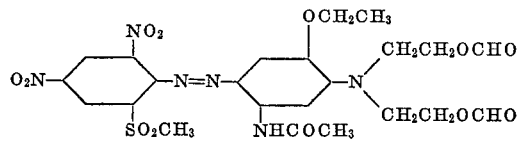
References Cited
UNITED STATES PATENTS
| | | | |
|---|---|---|---|
| 2,111,300 | 3/1938 | Senn | 260—207.1 XR |
| 2,249,749 | 7/1941 | Dickey et al. | 260—207.1 XR |
| 2,891,942 | 6/1959 | Merian | 260—207.1 |
| 3,178,405 | 4/1965 | Merian | 260—207 |
| 3,268,507 | 8/1966 | Kruckenberg | 260—207 |
| 3,342,803 | 9/1967 | Artz et al. | 260—207 |
FOREIGN PATENTS
856,348  12/1960  Great Britain.
FLOYD D. HIGEL, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,165            October 15, 1968

Winfried Kruckenberg

It is certified that error appears in the above identified patent and that said Letters Patent are hereby corrected as shown below:

Columns 3 and 4, dyestuff #10, that portion of the formula reading "NO" should read -- $NO_2$ --. Column 9, claim 5, that portion of the formula reading "NO" should read -- $NO_2$ --. Column 10, claim 7, that portion of the formula reading "$NOCOCH_3$" should read -- $NHCOCH_3$ --.

Signed and sealed this 13th day of October 1970.

(SEAL)
Attest:

Edward M. Fletcher, Jr.           WILLIAM E. SCHUYLER, JR.
Attesting Officer                   Commissioner of Patents